United States Patent [19]
Lynch et al.

[11] Patent Number: 5,044,448
[45] Date of Patent: Sep. 3, 1991

[54] FARM IMPLEMENT ATTACHING FITMENT

[75] Inventors: Bobby R. Lynch; Robert L. Lynch, both of Ozark, Mo.

[73] Assignee: TRI-L Manufacturing, Inc., Ozark, Mo.

[21] Appl. No.: 305,710

[22] Filed: Feb. 3, 1989

[51] Int. Cl.⁵ .............................................. A01B 51/00
[52] U.S. Cl. .................................... 172/272; 403/378; 280/416.2
[58] Field of Search ................ 403/108, 109, 378, 397, 403/24; 172/272; 280/416.1, 416.2, 515, 415.1

[56] References Cited

U.S. PATENT DOCUMENTS

| | | | |
|---|---|---|---|
| 3,195,651 | 7/1965 | Todd | 172/272 |
| 3,498,638 | 3/1970 | Magruder | 172/272 |
| 3,807,769 | 4/1974 | Thompson et al. | 172/272 |

Primary Examiner—Andrew V. Kundrat
Assistant Examiner—Carol I. Bordas
Attorney, Agent, or Firm—Harold F. Mensing

[57] ABSTRACT

Adjustable fitments for attaching any one of a variety of implements to the ends of the lifting and tilting arms of a tractor of the type normally used with front end loaders. Each fitment has a base member and a travelling member movably connected together by a rod assembly, such as a threaded rod assembly, whereby the spacing between the members can be adjusted to coincide with that of the mounting pins of the implement to be attached. Each of the members has a socket for receiving and holding one of a pair of vertically spaced horizontally disposed implement mounting pins. One of the sockets opens forwardly and the other socket opens upwardly. A manually operable latch mechanism is provided on the member which has the forwardly open socket to lock a corresponding implement pin in that socket and thus retain each pin of the pair in its respective socket.

10 Claims, 2 Drawing Sheets

FARM IMPLEMENT ATTACHING FITMENT

FIELD OF THE INVENTION

This invention relates to implement attaching fitments which are adapted to be mounted on the lifting and tilting arms of a farm tractor. More specifically, it relates to a pair of such fitments each having two vertically spaced apart sockets connected together by an adjusting mechanism whereby the spacing between the two sockets of each fitment may be varied readily with precision.

BACKGROUND OF THE INVENTION

A wide variety of implements designed to perform specific tasks are available for attachment to tractors, particularly farm tractors of the type which have hydraulically operated lifting and tilting arms characteristically used with front end loader buckets. During the course of a day's work it may be necessary to switch implements at least once. In a diversified farming operation it may be convenient to change implements many times during a short time period. Accordingly, for the sake of efficiency, it is important to be able to make the desired implement changeovers with a minimum expenditure of time and effort.

Although some manufacturers do provide so-called quick attachment mechanisms, generally these mechanisms are adapted for use exclusively with their brand of implements. As a result of this, a user is restricted in his choice of implements.

It is a general object of the invention disclosed herein to provide an improved implement attaching device which may be adjusted readily to fit virtually any implement so that hookups can be effected quickly and easily. It is also an object of this invention to provide such an attaching device that is easy to use, durably constructed and economical to produce.

SUMMARY OF THE INVENTION

The improved tractor implement attaching fitment of this invention is designed to be mounted on the ends of hydraulically operated lifting and tilting arms of a tractor so that a wide variety of implements can be attached quickly and easily. Two fitments are required for the normal four point hookups. Each fitment comprises a base member and a traveling member movably connected together in a spaced relationship by a vertically disposed threaded rod assembly. Each of the members has a socket for making a connection with its respective one of a pair of laterally disposed vertically spaced apart parallel pins permanently affixed to a particular implement the operator wishes to attach to his tractor. The top socket has an entrance opening facing upwardly whereas the bottom socket has an entrance opening facing forwardly. By rotating the threaded rod in the appropriate direction, the operator can adjust the spacing between the sockets to match the vertical spacing of the implement pins. The spacing adjustment may be made prior to the beginning of the hookup procedure or during it. Normally, the operator initiates the hookup procedure by manipulating his tractor so as to place the upwardly open top sockets of the attaching fitments directly under the top pair of implement pins. While still mounted on the tractor, he can raise the lifting arms until the top pair of implement pins are seated in the bottom of their sockets. Then he can tilt the fitments until the lower pair of implement pins slide into the forwardly open bottom sockets of the fitments and become seated in the rear end thereof. In the event the spacing between the top and bottom sockets has not been preset properly, the operator can dismount and make a final adjustment to align the bottom sockets with their respective implement pins so they can slide into place. The connection is completed by manually tripping spring loaded latches which retain the lower pins in their sockets. Preferably each of the latches has a frontal glide surface which extends upwardly from the bottom socket whereby the lower implement pin may be guided into its socket during spacing adjustment.

The various features of this invention and their advantages will be understood best if the following detailed description is read with reference to the accompanying drawings which illustrate the best mode of practicing the invention.

DETAILED DESCRIPTION OF THE INVENTION

Figure 3:
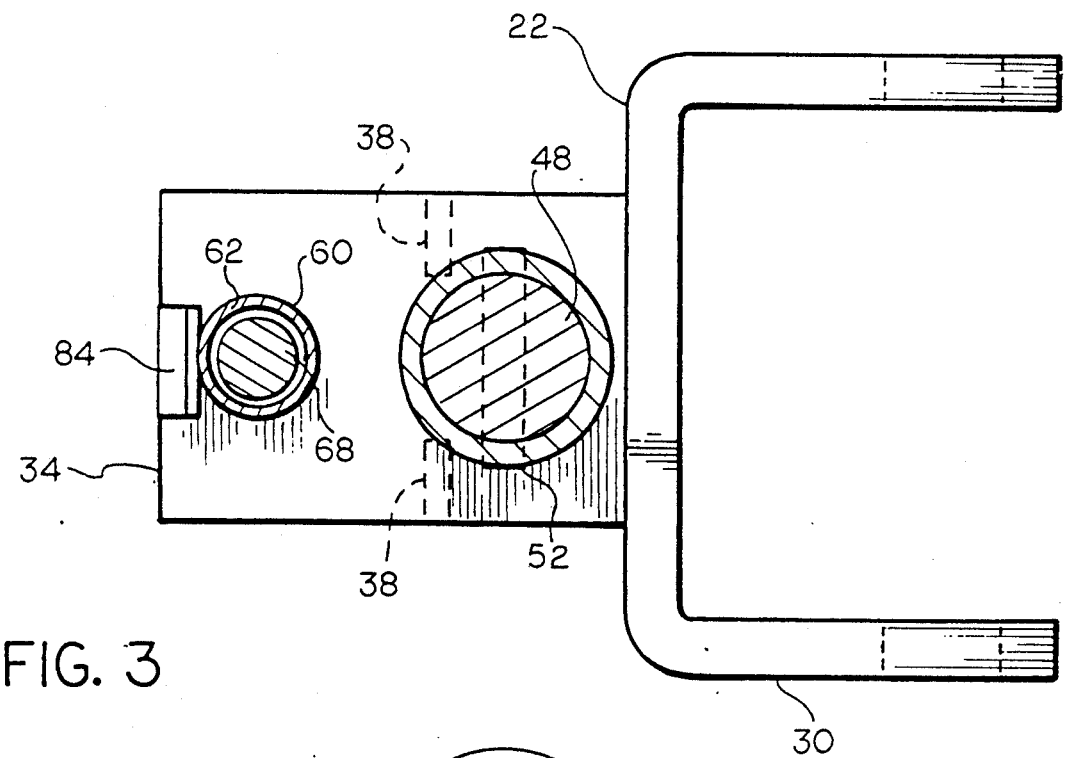
FIG. 3 is a sectional view taken along lines 3—3 of FIG. 1.
Figure 4:
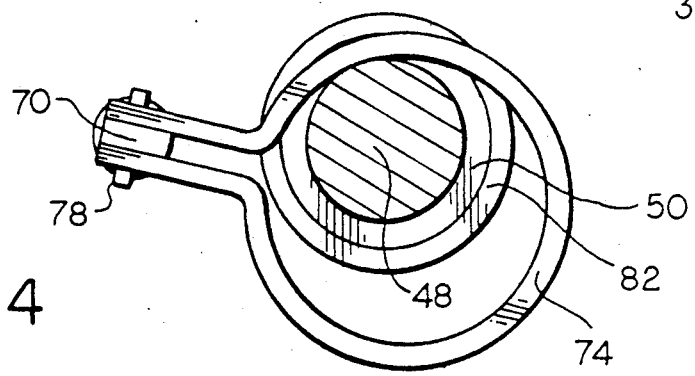
FIG. 4 is a sectional view taken along lines 4—4 of FIG. 1.

The tractor implement attaching fitment 20 illustrated in the drawings is comprised of three major components, namely; a base member 22, a traveling member 24 and a vertically disposed threaded rod assembly 26 adjustably connecting members 22 and 24 together in a spaced relationship. Base member 22 has a centrally located vertically disposed bushing section 28, with a rearwardly extending clevis section 30 and a forwardly extending socket section 32. Bushing section 28 and socket section 32 are formed of two vertically spaced parallel plates 34, 36 affixed at their rear edges to the front of the clevis section 30 adjacent to the top and bottom thereof. Two transversely disposed coplanar spacers 38 extend from top plate 34 to the bottom plate 36 and form the rear or back end of the base member socket 32. They are positioned symmetrically on opposite sides of the bushing centerline and have their coplanar front surfaces flush with the outer diameter of the adjoining bushing section (see FIG. 3). The portions of plates 34, 36 in front of spacers 38 define respectively the top and bottom surfaces of socket 32 which has a forwardly open entrance end defined by the front edges or lips of these plates.

Traveling member 24 is comprised of an internally threaded central section 40 in the form of a nut with a clevis section 42 affixed to a rear flat thereof and an upwardly open U-shaped socket section 44 affixed to a front flat thereof.

The relatively rotatable rod assembly 26 has an externally threaded top rod section 46, a coaxially aligned solid round shaft section 48 with a matching outer diameter and a concentric cylindrical sleeve 50 snugly fitted over adjacent ends of the rod and shaft sections. Dowels or roll pins 52, contained in bores extending laterally through the adjacent ends of the rod and shaft sections and corresponding portions of the sleeve, mechanically secure the sections together. The top end of the threaded rod section 46 is engaged in the nut section 40 of the traveling member 24 and the bottom end of shaft section 48 is journalled in bushing section 28 of the base member 22. The bottom end of sleeve section 50 forms a shoulder having a thrust bearing shoulder which rides against the top surface of top plate 34 and prevents downward axial movement of the rod assembly in the base member. A thrust bearing collar 54, located at the bottom end of shaft 48 and affixed thereto by means of a screw 56, has an opposed thrust bearing surface was bears against the bottom surface of bottom plate 36 and prevents axial movement in the opposite direction. This structure allows the rod assembly to be rotated relative to the base member and traveling member. Normally, the rod assembly can be rotated by hand without the need of a wrench or other turning device. However, the top end of threaded rod section 46 may be made with one or more pairs of parallel flats so that it can be engaged and turned by a wrench in the event one is needed. Rotation of the rod assembly will cause the traveling member to move axially toward or away from the base member, depending upon the direction of rotation, so that the vertical spacing between the top and bottom sockets can be adjusted precisely.

Figure 1:
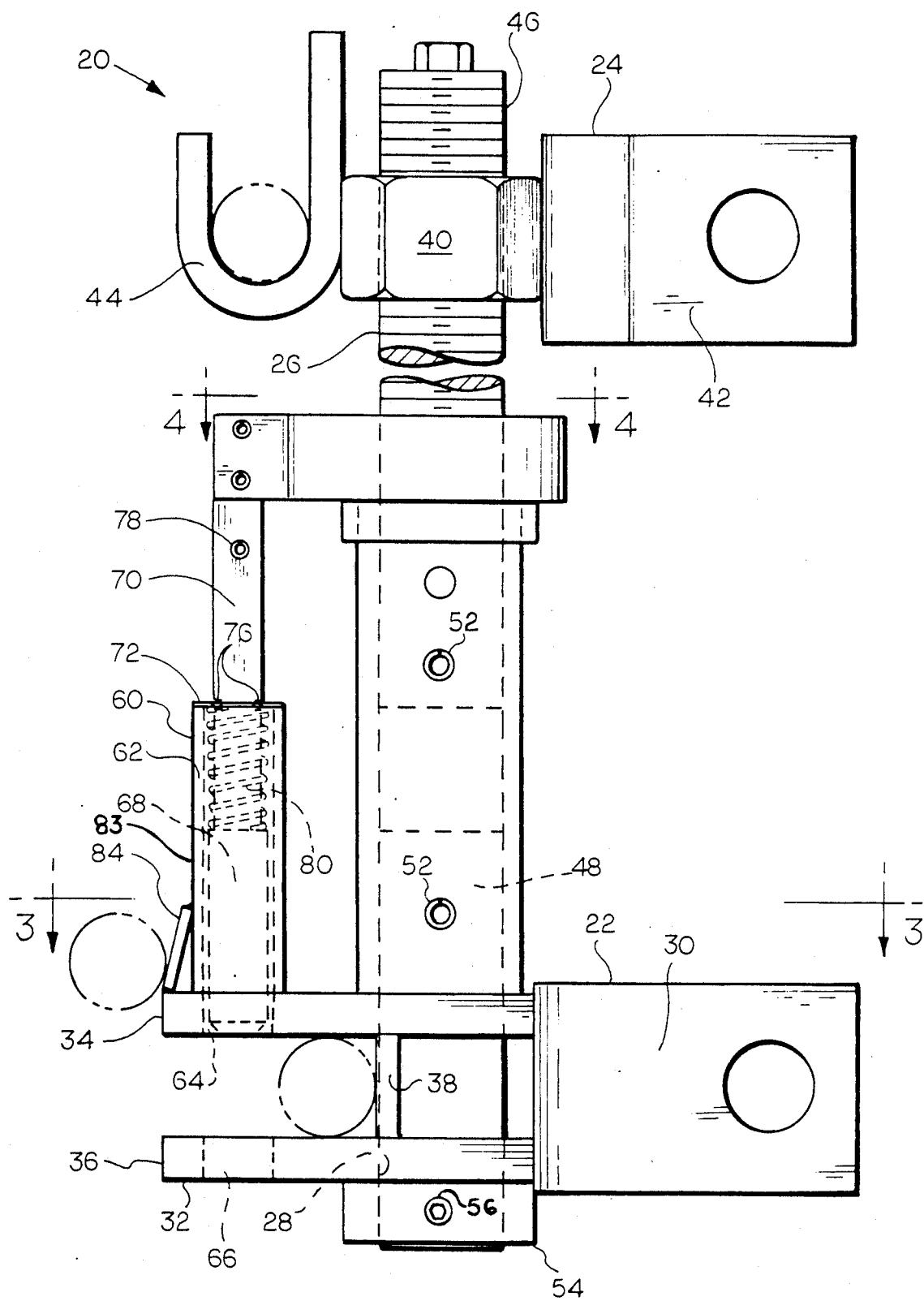
FIG. 1 is a side view of one of a pair of identical implement attaching fitments.
Figure 2:
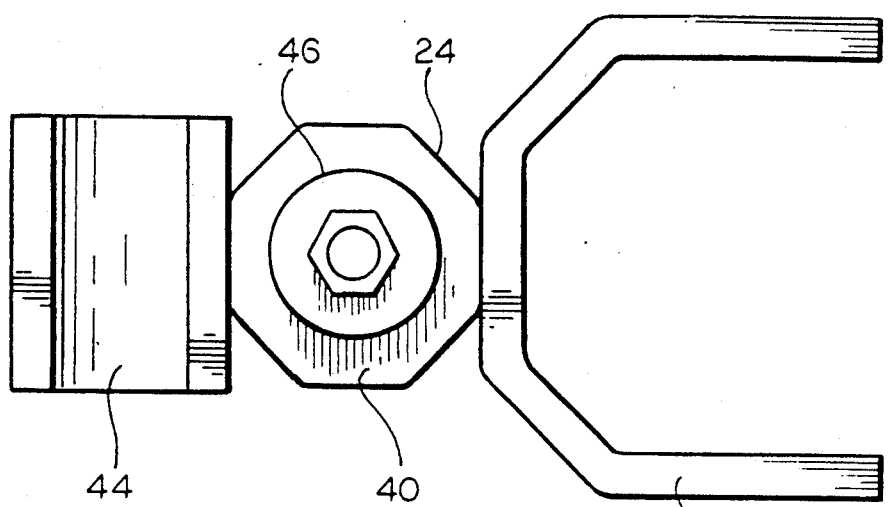
FIG. 2 is a plan view of the fitment shown in FIG. 1.

A latch mechanism 60 is provided to retain the lower implement pin (shown in phantom lines in FIG. 1) in its socket. Preferably the latch mechanism has a vertically disposed cylindrical sheath 62 affixed at its bottom end to the top of socket plate 34. Sheath 62 is coaxially aligned with a pair of latch bolt apertures 64,66 extending respectively through the lip portions of socket plates 34, 36 at aligned locations in front of an implement pin seat. Slideably contained within the sheath is a solid cylindrical latch bolt section 68 which has a diameter that is sized to slip through bolt apertures 64,66 and a length that is sufficient to extend concurrently through both apertures to thereby releasably lock the lower implement pin in the socket. A flat bar section 70 affixed to the top of the bolt section 68 extends upwardly through a slotted cap 72, located on top of the sheath, to a laterally extending annular hanger 74 affixed to the upper end of the bar. The annular hanger is designed to loosely embrace the adjoining cylindrical sleeve section 50 of the threaded rod assembly 26. Bar section 70 has a pair of notches 76 in opposite edges at an elevation intermediate its ends so as to allow limited rotation of the bar around its longitudinal axis in the cap slot when the bolt is lifted to a level whereat its bottom end clears the socket opening. It also has a laterally disposed stop pin 78 which limits the extent of downward travel by coming into contact with the slotted cap when the latch member is not being supported by the hanger. A helical spring 80 on the inside of the sheath extends from the top of the bolt section to the slotted cap and biases the latch member downwardly towards its latched position.

To operate the latch mechanism the latch assembly is lifted manually to a level at which the bottom of the annular hanger is at or slightly above the top of the adjoining cylindrical sleeve 50. At this point the hanger is rotated laterally into contact with the threaded portion of the threaded rod assembly. This movement brings a portion of the hanger over the shoulder formed by the top of sleeve 50 where it can be allowed to come to rest and remain there while the implement hookup procedure is initiated. The top surface of the shoulder may be enlarged to provide a wider rest by the addition of an annular collar 82.

One of two possible conditions prevail prior to commencement of the hookup procedure. Either the vertical spacing between the implement pins, on the implement to be attached, precisely matches the spacing between the sockets of the attaching fitment or the spacing does not match. In both instances the first step is to manipulate the tractor and its lifting arms so as to engage the top pair of implement pins with the top sockets of the fitments. The next step is to raise the fitments relative to the implement pins until the pins are seated in the bottom of the top sockets. Then the tilting arms of the tractor are manipulated so that the lower portions of the fitments are brought into contact with the lower pair of implement pins. In the event the vertical spacing of the implement pins and fitment sockets match each other, the lower pair of implement pins slides into the sockets and becomes seated in the back ends thereof. If the vertical spacing of the implement pins is less than that of the fitment, the lower implement pins come in contact with glide surfaces 83 on the front of the vertically disposed sheaths of the latch mechanisms at points above the lower sockets. This requires the equipment operator to adjust the fitment spacing by manually rotating the threaded rod assembly until the open front ends of the lower sockets become aligned with the implement pins. When this is accomplished the lower implement pins slip into their respective sockets. A forwardly inclined ramp 84 may be provided adjacent to the bottom end of the glide surface to deflect the implement pin outwardly to the lip of the socket as the pin rides downwardly on the front of the sheath. The hookup is completed by flipping the latch hanger off of its rest and allowing the latch bolt to drop in front of the seated lower pin and into bolt aperture 66.

The words "front", "back", "top", "bottom" and other similar terms are used solely in this application to explain and define the relative positions of the various elements of the implement attaching fitment. They relate to the relative positions shown in the drawings and are irrespective of the actual orientation of the fitment when mounted on a tractor.

Although the invention has been described with respect to a s illustrated embodimemt, it is to be understood that various minor modifications could be made without departing from the scope of the invention which is defined primarily by the appended claims.

What I claimd is:

1. A tractor implement attaching fitment comprising: a base member, a traveling member, a connecting means movably joining said members together such that said traveling member can be manually positioned a selected distance from said base member, each of said members having a front, a back, a top, a bottom and an open socket for receiving and holding an implement pin, said sockets being located on the fronts of said members, said socket on said traveling member being in the form of a hook with an entrance opening facing upwardly, said socket on said base member having an entrance opening facing forwardly, a latch mechanism for locking an implement pin in said base member socket, and a clevis member affixed to the back side of each of said base and traveling members.

2. A tractor implement attaching fitment according to claim 1 wherein said connecting means includes a threaded rod assembly having a lower end section journalled in said base member and a coaxially disposed upper threaded section engaged in and extending through a nut section of said traveling member.

3. A tractor implement attaching fitment according to claim 2 wherein said lower section of said rod assembly is a solid shaft section having an outer diameter which matches that of the threaded section of said assembly and is connected thereto by means of a surrounding snugly fitted cylindrical sleeve which extends over adjacent ends of said rod and shaft sections and is affixed to each of them by means of dowels contained in bores extending through said rod, shaft and sleeve.

4. A tractor implement attaching fitment according to claim 3 wherein said latch mechanism has a laterally disposed hanger which embraces said threaded rod assembly and is capable of being rested on the top of said sleeve to releasably hold a latch bolt section of said mechanism in an unlatched position.

5. A tractor implement attaching fitment according to claim 3 wherein said rod assembly is provided with opposed thrust bearing surfaces which bear respectively against top and bottom surfaces of said base member.

6. A tractor implement attaching fitment according to claim 1 wherein said latch mechanism has a vertically disposed front glide surface.

7. A tractor implement attaching fitment according to claim 6 wherein the lower end of said front glide surface is provided with a forwardly inclined ramp.

8. A tractor implement attaching fitment comprising: a base member, a traveling member, a threaded rod assembly movably joining said members together such that said traveling member can be manually positioned a selected distance from said base member, said threaded rod assembly having a lower end section journalled in said base member and a coaxially disposed upper threaded section engaged in and extending through a nut section of said traveling member, each of said members having a front, a back, a top, a bottom and an open socket for receiving and holding an implement pin, said sockets being located on the fronts of said members, said socket on said traveling member being in the form of a hook with an entrance opening facing upwardly, said socket on said base member having an entrance opening facing forwardly, a clevis member affixed to the back side of each of said base and traveling members, and a latch mechanism for locking an implement pin in said base member socket.

9. A tractor implement attaching fitment according to claim 8 wherein said lower section of said rod assembly is a solid shaft section having an outer diameter which matches that of the threaded section of said assembly and is connected thereto by means of a surrounding snugly fitted cylindrical sleeve which extends over adjacent ends of said rod and shaft sections and is affixed to each of them by means of dowels contained in bores extending through said rod, shaft and sleeve, said rod assembly is provided with opposed thrust bearing surfaces which bear respectively against top and bottom surfaces of said base member.

10. A tractor implement attaching fitment according to claim 8 wherein said latch mechanism has a vertically disposed front glide surface and the lower end of said front glide surface is provided with a forwardly inclined ramp.

* * * * *